(12) United States Patent
Holcomb

(10) Patent No.: US 6,703,066 B1
(45) Date of Patent: Mar. 9, 2004

(54) FLAVOR ENHANCER COMPOSITION CONTAINING COLLOIDAL SILICA AND METHOD FOR ITS PREPARATION AND USE

(76) Inventor: Robert R. Holcomb, 2100 W. End Ave., Suite 1150, Nashville, TN (US) 37203

( * ) Notice: Subject to any disclaimer, the term of this patent is extended or adjusted under 35 U.S.C. 154(b) by 0 days.

(21) Appl. No.: 08/815,971

(22) Filed: Mar. 13, 1997

Related U.S. Application Data

(63) Continuation of application No. 08/375,611, filed on Jan. 20, 1995, now abandoned, which is a continuation of application No. 07/911,872, filed on Jul. 10, 1992, now abandoned.

(51) Int. Cl.⁷ .................................................. A23L 1/221
(52) U.S. Cl. ........................ 426/650; 426/237; 426/534
(58) Field of Search ................................. 426/650, 237, 426/534; 204/155, 157.5

(56) References Cited

U.S. PATENT DOCUMENTS 4,311,720 A * 1/1982 Marmo et al. .............. 426/594
5,011,690 A * 4/1991 Garvey et al. .............. 424/401

FOREIGN PATENT DOCUMENTS

| GB | 1188642 A | * | 4/1970 |
| JP | 53-104772 | * | 2/1977 |
| JP | 54020979 A | * | 2/1979 |

* cited by examiner

*Primary Examiner*—Lien Tran
(74) *Attorney, Agent, or Firm*—Mallinckrodt & Mallinckrodt; Robert R. Mallinckrodt

(57) ABSTRACT

Flavor potentiating and enhancing compositions include an aqueous mixture containing colloidal silica of preferable 10–100 angstrom particle size. The colloidal silica acts synergistically with other flavor inducing agents which may also be present in the mixture. The compositions according to the invention have been found to enhance flavor, tenderize meats, aid in the formation of a stable crust on breaded fried foods, and impart improved body, consistency, and flavor in soups, dressings, and beverage. Also a novel method for generating the colloidal silica in the presence of a magnetic field is disclosed.

27 Claims, 2 Drawing Sheets

FLAVOR ENHANCER COMPOSITION CONTAINING COLLOIDAL SILICA AND METHOD FOR ITS PREPARATION AND USE

This is a continuation, of application Ser. No. 08/375,611 filed Jan. 20, 1995, now abandon which is a continuation of application Ser. No. 07/911,872 filed Jul. 10, 1992, now abandon.

BACKGROUND OF THE INVENTION

1. Field:

The present invention relates to flavor enhancing agents and flavor potentiators for use with foods, and to methods of preparing such enhancers.

2. State of the Art:

Various flavor potentiators and flavor enhancers are known and in common use with food products. Flavor potentiators are believed to increase the sensitivity of taste buds, thus increasing the natural flavors in foods. Flavor enhancers, when added to foods, are believed to act as solvents or detergents to free more flavor from foods, to make more flavor available for tasting, and to assist such flavors in penetrating the taste buds more readily. Disodium inosine-5'-monophosphate [IMP], disodium guanosine-5'-monophosphate [GMP], maltol, and ethyl maltol are known as weak flavor enhancers.

It is well known that the combination of monosodium L-glutamate [MSG] and a flavor inducing 5'-nucleotide, such as disodium inosine-5'-monophosphate [IMP], disodium guanosine-5'-monophosphate [GMP], or mixtures thereof, exhibit a synergistic flavoring activity. Thus, with the use of MSG, lower amounts of total flavor enhancers can be used at a reduced cost to the user. MSG itself is a powerful flavor enhancer and, with or without other flavor enhancers, is widely used as a flavor enhancer in the food industry. It is added to many processed foods and is available as a powder to be added to foods during home preparation. However, MSG can act as a vasodilator. As such, it is a common cause of headache in migraine prone individuals. It also frequently causes a sensation of fatigue, bloating, and gastric distress in sensitive individuals. Recent studies have also linked other health problems to overuse of MSG. There is a need for a non-toxic flavor inducing agent, especially one that will exhibit a synergistic effect with other flavor inducing substances, so that it may be used in very small quantities to enhance the flavor of foodstuffs.

It is known that silica in small amounts is present in some drinking waters. The silica is considered a natural mineral in such waters with no known adverse health effects. However, such waters do not demonstrate any flavor potentiating or enhancing properties.

It is also known that water can be treated magnetically to modify the properties of such water, see for example, my U.S. Pat. No. 4,888,113. However, while such magnetic treatment in some instances can improve the taste of water having high iron, sulfur, chlorine, organic tannin, or acid content, such treated water is not known as a flavor potentiator or enhancer.

SUMMARY OF THE INVENTION

I have discovered that an aqueous composition containing small quantities of an inorganic colloidal silica, particularly if the colloidal silica particles are highly charged, acts as a flavor potentiator and flavor enhancer and also exhibits a synergistic enhancement of the flavor inducing activity of other flavor inducing agents such as 5'-nucleotides, maltol, ethyl maltol, and monosodium glutamate. Thus, the invention comprises an aqueous taste enhancing composition of matter including an inorganic colloidal silica or a unique blend of an inorganic colloidal silica in combination with another flavor inducing agent such as a 5'-nucleotide or ethyl maltol, and methods of enhancing the flavor of food by adding such compositions to a food whose natural flavor it is desired to enhance.

Depending upon the particular application, other flavor enhancing substances, such as amber soy sauce and garlic juice, can be added to the composition. The compositions according to the invention have been found to enhance flavor, tenderize meats, aid in the formation of a stable crust on breaded fried foods, and impart improved body and consistency in soups, dressings, and beverages.

The composition preferably contains colloidal silica particles of from 10 to 100 angstroms in size and in concentration from 30 parts per billion (PPB) to 500 parts per million (PPM) with a preferred range when the composition is to be added directly to foods of between 5 PPM and 20 PPM. The more concentrated composition (up to 500 PPM) will generally be diluted by other ingredients before use, and the lesser concentration (down to 30 PPB) results when the composition is mixed with other ingredients to form products such as marinates in which meat, fish, or poultry may be marinated.

Also, one aspect of the invention is a novel method for generating a colloidal silica solution of the invention employing silicon dioxide, and a mixing device with means for circulating the solution through a magnetic field during mixing. The magnetic field increases the charge or zeta potential on the colloidal silica. This is believed to further activate the colloidal silica as a flavor potentiator and to help prevent gelling of the silica in the solution or precipitation of the silica from the solution.

BRIEF DESCRIPTION OF THE DRAWINGS

The best mode presently contemplated for carrying out the invention in actual practice is illustrated in the accompanying drawings, in which.

DETAILED DESCRIPTION OF THE INVENTION

Figure 1:
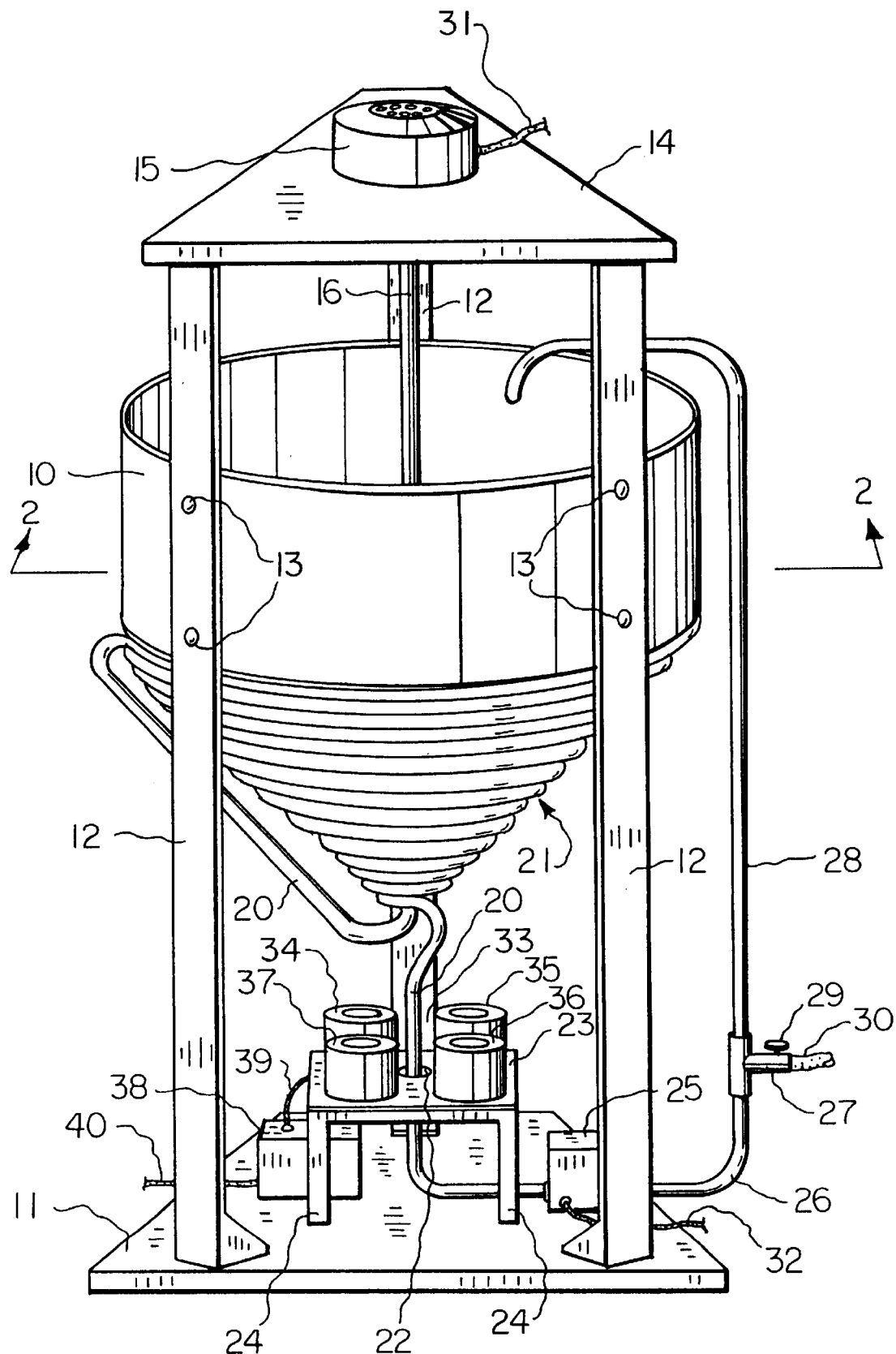
FIG. 1 is a perspective view of a mixing apparatus useful for making colloidal silica solutions according to the invention.

The flavor enhancer of the invention comprises an aqueous solution with a colloidal suspension of inorganic silica particles therein. The silica particles are preferably 10 to 100 angstroms in size and present in the solution when ready for use in adding to food as a flavor potentiator and flavor enhancer in a concentration of between about 5–20 parts per million (PPM). However, the solution can be prepared and used in concentrated form up to about 500 PPM and when incorporated into various products such as a marinate, can be used in concentration down to about 30 parts per billion (PPB) or less. The solution is preferably prepared in such a way that the colloidal particles become charged and the charge is stabilized so that the particles remain charged and remain in suspension during a relatively long shelf life of the solution. The solution may be stabilized with citric acid (tripotassium salt) and pH adjusted with acetic acid so it will also contain traces of citrate and acetate. In a preferred form of the invention, the solution contains about 14 PPM colloidal silica, 0.001 moles/liter of potassium citrate, and traces of acetate, in purified distilled water. This aqueous solution may be added in very small amounts to foods to enhance the flavor of the foods, to add consistency to the foods, particularly liquids such as beverages, soups, salad dressings, or gravies, or to tenderize foods such as meats.

While the aqueous solution of colloidal inorganic silica alone may be added to foods to produce the desired results, it has been found that the colloidal silica works in a synergistic manner with other known weak flavor enhancers such as 5'-nucleotides, as disodium inosine-5'-monophosphate [IMP], disodium guanosine-5'monophosphate [GMP], maltol, or ethyl maltol. It has been found that when combined with these other weak flavor enhancers, the combinations become very strong flavor enhancers which can be substituted in lesser amounts for combinations of monosodium glutamate (MSG) and a weaker flavor enhancer to produce essentially the same flavor enhancement. The combination of the silica solution with maltol or ethyl maltol is used with fruit products such as in jams, jellies, juices, and fruit drinks to improve and enhance the fruit taste and aroma. The combination of the silica solution with the weak flavor enhancer such as GMP, IMP, or a combination, is used with meats, vegetables, and dairy products to provide enhanced flavor and better consistency. When used with meats, poultry, soups, salads, salad dressing, mayonnaise, canned or frozen vegetables, and dairy products, the product is further improved by the addition of hydrolyzed vegetable protein, such as soy sauce, and garlic juice. The soy sauce may be an amber soy sauce with 10 ml of garlic juice added to each 250 ml of soy sauce.

For meat, poultry, or fish, a marinate including the colloidal silica solution, along with IMP, GMP, or a combination thereof, and amber soy sauce, and garlic juice may be used. The soy sauce is not a necessary ingredient in the marinate but use of soy sauce gives some improvement in flavor and adds to the tenderizing effect of the marinate. With such marinate, the colloidal silica solution of the invention may be considered as added to the marinate so the silica concentration, as with other foods to which the composition of the invention is added, is much less than in the preferred silica solution composition in a form to be added to food but.prior to addition to the food. Thus, while a preferred concentration of silica in the composition ready to be added to food is between 5 and 20 PPM, after addition to the marinate, the silica is present in only parts per billion concentration, such as about 38 parts per billion. Similarly, when added to other food products in small amounts, the concentration of the silica is much diluted in the final food product. When preparing products such as a marinate, a concentrated silica solution may be mixed with other ingredients which dilute the silica solution to its final concentration.

When soaked in the marinate described above for between about 10–30 minutes, meat, poultry, or fish take on additional hydration. It is believed that the charged colloidal particles may alter membrane permeability and water along with spices and tenderizers from the soy sauce and/or garlic juice enter the cell by diffusion or osmosis. The meat, poultry, or fish may take on as much as 10% additional weight, with much improvement of the flavor and tenderness. In addition, the marinate forms a strong floc which involves the soy protein and the protein of the meat, poultry, or fish. If the meat, poultry, or fish, is to be fried in a batter, the flour or batter is entrapped in the floc. This forms a very adherent crust on the meat, poultry (such as skinless chicken), or fish.

A similar mixture of the colloidal silica, with IMP, GMP, or a combination thereof, amber soy sauce, and garlic juice may be added to soups, dressings, gravies, and beverages to improve their body and consistency.

The combination of colloidal silica with IMP, GMP, or a combination thereof is also effective to suppress unwanted tastes. Addition to milk suppresses the "off taste" or after taste. The addition of colloidal silica and ethyl maltol to grapefruit juice completely suppresses the bitter taste and enhances the sweet grapefruit flavor.

To prepare the inventive composition, an aqueous solution of colloidal silicon dioxide is first made up. This can be done by starting with a solution that is about 27% silicon dioxide in 3–4 molar NaOH. As one option, it has been found that citric acid or citric acid salts added.in molar amounts about equal to the molarity of the NaOH improve the stability of the end solution. The starting solution and citric acid or citric acid salts, if present, is diluted very slowly, with stirring. Preferably, this is done over a period of several hours. Next, the solution is very slowly titrated with about 0.5–1.0 molar of an acid, usually hydrochloric or acetic acid, to a pH of between about 7.6 and 8.2. Again, this is preferably done over a period of several hours with constant stirring. The final concentration is a solution of preferably about 0.050% (about 500 parts per million) colloidal silica. At this time the silica is present as colloidal particles of between about 10 to 100 angstroms in size. This solution is then further diluted to the preferred concentration between about 5 and 20 PPM prior to use, and may have additional flavoring agents added thereto as described above and below.

The nature of the silicate solution is represented by the following equations at 25° C.:

$$SiO_2 + 2H_2O \rightleftharpoons Si(OH)_4 \qquad (1)$$

$$Si(OH)_4 + OH^- \rightleftharpoons HSiO_3^- + 2H_2O \qquad (2)$$

$$2HSiO_3^- \rightleftharpoons Si_2O_3^= + 2H_2O \qquad (3)$$

$$HSiO_3^- + OH^- \rightleftharpoons SiO_3^= + H_2O \qquad (4)$$

In my process, as the pH is lowered, polymerization of monomer occurs to form particles, i.e., $Si(OH)_4$ condenses to form colloidal particles. The condensation forms Si-O-Si links. This is believed to lead to a highly porous, tangled network of branching chains which will accept electrical charge. The solution is inhibited from becoming a gel by the addition of citrate and because of the like charges on the particles which cause the particles to repel one another.

It is preferred that the mixing of the colloidal silica solution take place under the influence of a magnetic field. This causes the silica particles to take on a strong charge or zeta potential. It has been found effective to circulate the solution through a magnetic field during the mixing and neutralization of the solution. The slow neutralization under the influence of the magnetic field limits growth of particles to sizes less than about 100 angstroms so that the particles do not grow to a size that will precipitate out of the solution or that will form a gel. The colloidal particles become stabilized and will remain suspended in solution indefinitely.

Figure 2:
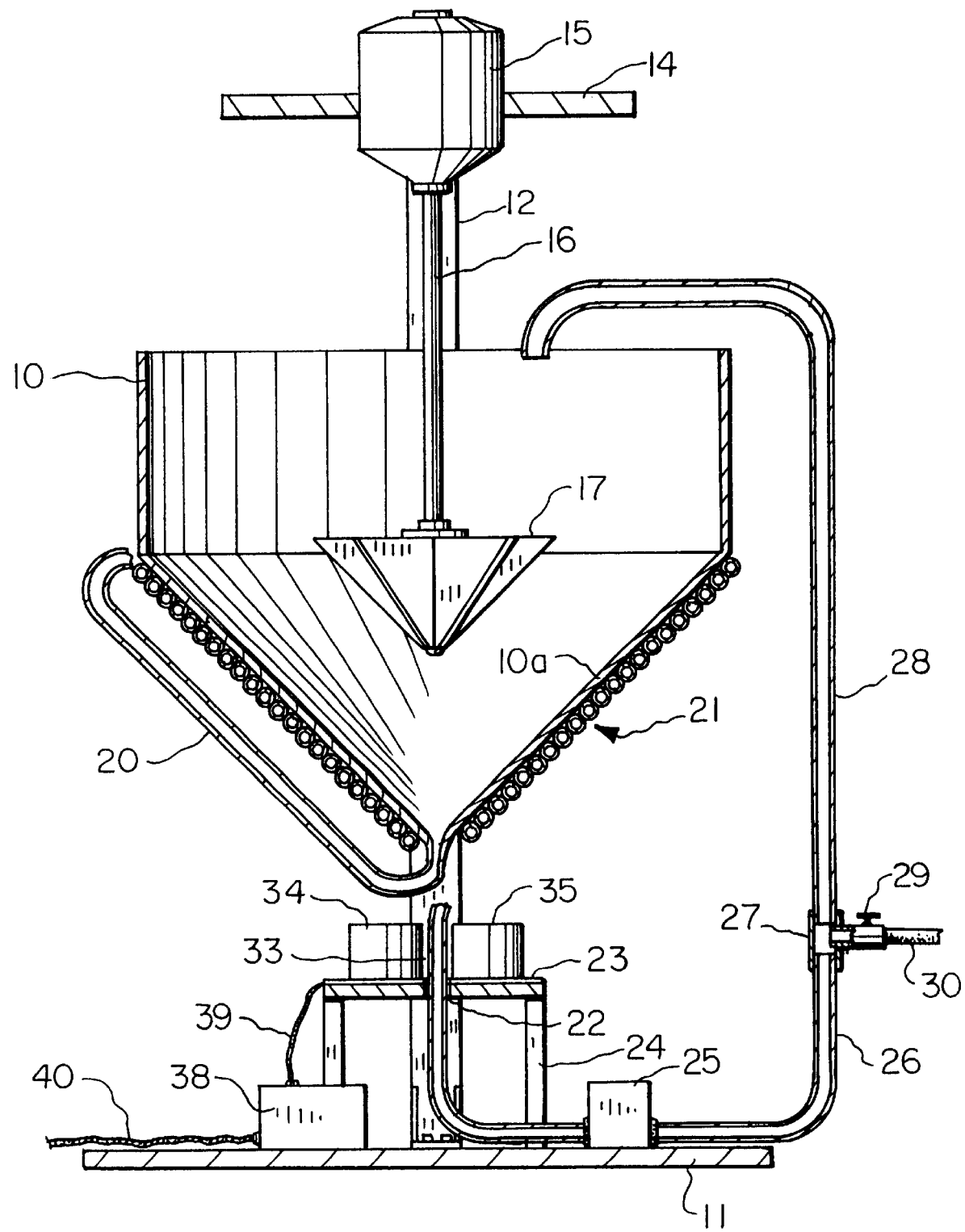
FIG. 2, a vertical section taken on the line 2—2 through the center of the mixing apparatus of FIG. 1, but with some parts shown in elevation.

Apparatus which has been found advantageous for mixing the colloidal solution is shown in FIGS. 1 and 2. As shown, a mixing chamber 10 is supported above base 11 by supporting legs 12, secured to mixing chamber 10 as by screws 13. A platform 14 is mounted to the tops of legs 12 and extends over mixing chamber 10 to support a motor 15. A shaft 16 extends from motor 15 to support a mixing blade 17, FIG. 2, in mixing chamber 10. The lower portion 10a of mixing chamber 10 is of conical formation.

Nonferrous tubing 20 extends from the vortex of the lower conical portion 10a of mixing chamber 10 to the top of the conical portion where it is wrapped into a helical coil, indicated generally as 21, around the conical portion 10a of mixing chamber 10. From the bottom of helical coil 21, tubing 20 extends through an opening 22 in platform 23 supported above base 11 and below mixing chamber 10 by legs 24, and to pump 25. From pump 25, tubing 26 extends to a tee fitting 27, and tubing 28 continues from the tee fitting to the top of mixing chamber 10. A valve 29 is positioned in the base of tee 27 and controls flow into tubing 30 extending from the base of tee 27. Motor 15 and pump 25 are both electrically powered so have electrical wires 31 and 32, respectively, extending therefrom.

Four electromagnets 34, 35, 36, and 37 are securely mounted in platform 23 such as by being received in recesses therein as shown by broken lines in FIG. 2. Magnets 34, 35, 36, and 37 are arranged so that the poles of the magnets are in a single plane and form the vertices of a quadrilateral shape in that plane. Preferably that quadrilateral shape is a square as for the arrangement illustrated. The poles of adjacent magnets are of opposite orientation such as indicated by the "+" and "−" signs in FIG. 1. With this arrangement, the two positive poles, shown as magnets 34 and 36, form one pair of opposite vertices of the quadrilateral shape while the two negative poles, shown as magnets 35 and 37, form the other pair of opposite vertices. Each of the magnetic poles is magnetically attracted by the two oppositely charged, adjacent poles and repelled by the opposite like charged pole. The four magnets exert a sphere of magnetic influence on one another and create a magnetic field between them through which tubing 20 passes. As illustrated, tubing 20 is oriented parallel to each of the four electromagnets and is preferably spaced equidistant from each.

It is preferred that the four electromagnets 34, 35, 36, and 37 be identical, except for their pole orientation, and that they each produce approximately equal magnetic flux. Electromagnets which create about 2000 to 3000 gauss each have been found satisfactory, and in such instances, each magnet should produce equal flux within plus or minus 200 gauss, i.e. the gauss produced by such magnets should all be equal within a range of about 400 gauss. Also, the magnetic flux for each magnet should be centered in each pole. The electromagnets are powered by a D.C. power supply 38 with wires 39 connecting the power supply to the magnets in standard fashion. A wire 40 extends from D.C. power supply 38 to a source of electrical power, such as a source of standard 120 volt AC power, not shown.

To prepare the colloidal suspension of the invention using the apparatus shown and described, mixing chamber 10 is filled with purified water. The use of purified water has been found to produce the best results. The water is purified by series filtering through various filter beds depending upon the impurities in the starting water, by then heat distilling the water, aerating it, and then passing it through an ultraviolet light chamber. It has been found that for most public water supplies, the water should be first chlorinated to 3 PPM and aerated, then passed through a $CaMgCO_3$ (crushed marble) filter, a +35−20 mesh clinoptilolite filter, a particulate filter, and a −20+35 mesh activated carbon filter, before aeration and ultraviolet sterilization.

The purified water is circulated by pump 25 from mixing chamber 10, through the helical coil 21 and the magnetic field generated by electromagnets 34, 35, 36 and 37, and back into mixing chamber 10 on a continuous basis for about 30 minutes. A silica concentrate comprising 27% silicon dioxide in 3 molar NaOH is then added to the circulating purified water. This mixture is circulated through the helix and magnetic field for about four hours. During this four hours of circulation, equal molar concentrations of citric acid in the form of tripotassium salt is slowly added to the solution. After circulation for about four hours with the slow addition of tripotassium salt, the pH of the solution is adjusted to pH 7.68 with acetic acid (1 molar). The adjusted solution is then circulated for an additional two hours. The resulting solution is then diluted with purified water to a final desired concentration of between about 5 and 20 PPM, and preferably between about 14 and 16 PPM of silica. Circulation through the helix and magnetic field is continuous during the whole procedure. When finished, the silica solution is removed from the apparatus by opening valve 29 in tee 27 to allow the finished solution to flow through tubing 30 to storage, packaging, or the next stage of mixing.

If desired, the silica solution can be removed from the apparatus through valve 29 and tubing 30 in a concentrated form. prior to the final dilution step indicated above, or after only partial dilution. In such cases, the concentrated silica solution will be diluted prior to or during further processing.

It is preferred that the helical coil 21 be oriented so that the mixture travels during circulation therethrough in the direction it would normally circulate when draining from a basin, that is, counterclockwise in the northern hemisphere and clockwise in the southern hemisphere. Taste tests have shown greater potency when this rule is observed.

After generation of the colloidal silica solution, in most cases, a flavor inducing agent, such as ibotenic acid, tricholomic acid, guanosine-5'-monophosphate (GMP), inosine-5'-monophosphate (IMP), xanthosine-5'-monophosphate, 5'-inosinate, 5'-luanylate, and/or other 5'-nucleotides, maltol (C6H603), ethyl maltol, dioctyl sodium sulfosuccinate, N,N'-di-o-tolylethylenediamine, cyclamic acid and the like, or even monosodium glutamate [MSG], may be combined with the colloidal silica solution. This may be done using any available mixing equipment and methods. For example, disodium GMP, is weighed out preferably as a dry powder and mixed to a concentration of between 2% and 5% in a 15 PPM colloidal silica solution. If desired, the flavor enhancing composition can include up to about 70% by weight of amber soy sauce and up to about 1% garlic juice. If MSG is used, it is noted that much lower levels of MSG than normally used for flavor enhancement can be used because of the synergistic effect of the colloidal silica. It is believed that such lower levels are nontoxic. It should also be noted that MSG naturally occurs in small amounts in soy sauce so that if soy sauce is included, some MSG, at a low level, will be present.

Taste tests with the colloidal silica of the invention substituted for normally used MSG have shown that the colloidal silica solution produces substantially the same flavor profile as does MSG, according to the taste testing, without the use of any MSG.

The following examples are given to illustrate embodiments of the invention in accordance with preferred practice. It will be understood that these examples are illustrative and the invention is not to be considered as restricted thereto.

The examples set forth mixtures of ingredients, with each ingredient given as a weight percentage except for colloidal silica [CS], which is given as parts per million [PPM] or parts per billion [PPB]. In each example water comprises the balance of each mixture.

EXAMPLE I

Three milliliters of an aqueous mixture containing 5 PPM CS, 1.7% disodium GMP, 67% amber soy sauce, and 0–1% garlic juice was added to one cup of vegetable beef soup. The composition imparted a rich meaty flavor to the soup and enhanced the flavor of the vegetables.

EXAMPLE II

About 1 milliliter of an aqueous mixture containing 11 PPM CS, 3.3% disodium GMP, 33% amber soy sauce, 0–1% garlic juice was added to one cup of mayonnaise. The mixture imparted a richer, smoother taste and decreased the tartness of the mayonnaise.

EXAMPLE III

About 2½ milliliters of an aqueous mixture containing 10 PPM CS, about 3% disodium GMP, 40% amber soy sauce, 0–1% garlic juice was added to one cup of chicken noodle soup. The soup was given a better body and richer chicken and spice flavor.

EXAMPLE IV

Two drops of an aqueous mixture containing 15 PPM CS and. saturated solution of ethyl maltol was added to one cup of jelly. The jelly was given a more pronounced fruit flavor with suppression of the strong sugar taste.

EXAMPLE V

Beef steaks were marinated in excess aqueous mixture containing 38 PPB CS, 0.012% disodium GMP, 19.6% amber soy sauce, and about 0.5% garlic juice for 10 minutes. The meat took on a 10% increase in weight. The meat was then cooked and found to have much improved tenderness, moisture, and enhanced flavor.

EXAMPLE VI

Turkey steaks were marinated in excess aqueous mixture according to Example V for 4 minutes and then allowed to stand for 5 minutes. The steaks were then lightly brushed with vegetable oil Some of the steaks were frozen and later grilled in frozen condition over a charcoal grill and some were immediately grilled over a charcoal grill. Whether grilled immediately, or whether a frozen steak was grilled, the steaks were tender and moist and had only a hint of turkey flavor.

EXAMPLE VII

Catfish filets were marinated in excess aqueous mixture according to Example V for about 10 minutes. Some filets were then dipped in batter. The adherence of batter was found to be improved along with better taste and body for the filets. Marinated filets grilled on an open grill without being battered were found to cook without breaking apart and had a milder fish taste than similar nonmarinated filets.

EXAMPLE VIII

One or more drops of an aqueous mixture containing 15 PPM CS and saturated solution of ethyl maltol was placed in 12 ounces of grapefruit juice. The bitter grapefruit taste was completely suppressed and the sweet grapefruit flavor enhanced.

EXAMPLE IX

About 2.25 milliliters of an aqueous mixture containing 9 PPM CS, 2.8% disodium GMP, 44% amber soy sauce, and 0–1% garlic juice was added to one cup of chicken salad. A richer, smoother taste with decreased tartness was imparted.

EXAMPLE X

Two drops of an aqueous mixture containing 15 PPM CS and 5% disodium GMP was added to 12 ounces of milk. The after taste of the milk was removed.

EXAMPLE XI

About two milliliters of an aqueous mixture containing about 8 PPM CS, 2.5% disodium GMP, 50% amber soy sauce, and 0–1% garlic juice was added to one cup of French dressing. The dressing was given a smoother taste with decreased tartness.

EXAMPLE XII

To about 500 milliliters of grapefruit juice prepared from frozen concentrate and 150 milliliters of vegetable oil, eight milliliters of an aqueous mixture containing about 15 PPM CS and 5% GMP was added. This was blended into an emulsion. This emulsion was then blended with about four cups of flour and ¼ teaspoon of baking soda and rolled and cut into biscuits. The baked milk-free biscuits taste like a butter milk biscuit.

EXAMPLE XIII

To one and one quarter cups of grapefruit juice, one-half cup of white grape juice, one-quarter cup orange juice, 150 milliliters vegetable oil, and 5 tablespoons of natural buttermilk flavor; 10 milliliters of an aqueous mixture containing about 15 PPM CS and 5%. GMP was added. This mixture was blended together in a blender for about five minutes and refrigerated prior to use. Sufficient mixture was then added to four cups of self-rising flour and one quarter teaspoon of baking soda to form a doughy consistency. The Biscuits were cut from the dough and baked at 400° F. for 18 minutes. The baked milk-free biscuits taste like a buttermilk biscuit. The baked biscuits may be frozen for several months, thawed, and cooked in a 400° F. oven for four minutes. The biscuit has the same taste and consistency as a freshly baked biscuit.

Some of the uncooked biscuits cut from the dough were stored in a refrigerator at about 38° F. for 30 days. Upon cooking, these biscuits tasted like a fresh made biscuit.

Whereas this invention is here illustrated and described with reference to embodiments thereof presently contemplated as the best mode of carrying out.such invention in actual practice, it is to be understood that various changes may be made in adapting the invention to different embodiments without departing from the broader inventive concepts disclosed herein and comprehended by the claims that follow.

I claim:

1. A composition for treating food to alter a property of the food comprising an aqueous suspension of charged silica particles wherein said aqueous suspension of charged silica particles is generated by slowly lowering the pH of an initial alkaline silica solution while the solution is continuously circulated through a magnetic field to produce charged, relatively stable, colloidal silica particles of size between about 10 and 100 angstroms.

2. A composition for treating food according to claim 1, wherein the composition additionally comprises one or more-flavor inducing agent, whereby the composition is added to the food to be treated to enhance the flavor of the food.

3. A composition for treating food to enhance the flavor of the food according to claim 2, wherein the said one or more flavor inducing agents is selected from the group consisting of ibotenic acid, tricholomic acid, guanosine-5'-monophosphate, xanthosine-5'-monophosphate, inosine-5'-monophosphate, 5'-inosinate, 5'-luanylate, maltol, ethyl maltol, dioctyl sodium sulfosuccinate, N,N'-di-o-tolylethylenediamine, cyclamic acid, and monosodium glutamate.

4. A composition for treating food to enhance the flavor of the food according to claim 3, wherein the colloidal silica is present in amounts from about 30 parts per billion to about 500 parts per million and further comprises;

from about 0.1 percent to about 5 percent by weight of said one or more flavor-inducing agents;

from 0 to about 70 percent by weight amber soy sauce; and from 0 to about 1% garlic juice.

5. A composition for treating food to enhance the flavor of the food according to claim 4, wherein the composition further includes citric acid or a salt thereof.

6. A composition for treating food to enhance the flavor of the food according to claim 2, wherein the flavor-inducing agent is a 5'-nucleotide.

7. A composition for treating food to enhance the flavor of the food according to claim 6, wherein the 5'-nucleotide is disodium-guanosine-5'-monophosphate.

8. A composition for treating food according to claim 1, wherein the concentration of the colloidal silica particles is between about 5 and 20 parts per million, and the composition further comprises citric acid or a salt thereof, whereby the composition is added to the food to be treated to enhance the flavor of the food.

9. A composition for treating food to enhance the flavor of the food according to claim 8, wherein the citric acid salt is about 0.001 moles per liter of potassium citrate.

10. A composition for treating food according to claim 1, wherein the composition additionally comprises soy sauce and garlic juice, whereby the composition is added to the food to be treated to enhance the flavor of the food.

11. A composition for treating food according to claim 10, wherein the composition is in the form of a marinade and is added to the food by soaking the food therein.

12. A composition for treating food according to claim 1, wherein the composition additionally comprises fruit juice and ethyl maltol, whereby the composition is added to ingredients to form a dough for a baked product, the composition being added to the ingredients as a replacement for milk which is usually, included in the dough so that the flavor of the baked product without the milk is enhanced to taste similar to a product made with milk.

13. A composition for treating food to enhance the flavor of the food according to claim 12, wherein the composition additionally includes vegetable oil and the composition is in the form of emulsion.

14. A composition for treating food according to claim 1, wherein the composition is in the form of a marinade whereby the food to be treated is soaked in the composition to cause the food to absorb some of the composition to increase the hydration of the food through absorption of some of the composition.

15. A composition for treating food to increase the hydration of the food according to claim 14, wherein the composition further comprises soy sauce and garlic juice.

16. A composition for treating food to increase the hydration of the food according to claim 15, wherein the composition further comprises citric acid or a salt thereof.

17. A composition for treating food to increase the hydration of the food according to claim 14, wherein the composition further comprises citric acid or a salt thereof.

18. A composition for treating food according to claim 1, wherein the composition is added to the food to be treated to alter the consistency of the food.

19. A composition for treating food according to claim 1, wherein the food to be treated is coated with the composition to enhance the food's ability to hold a crust batter.

20. A composition for treating food according to claim 16, wherein the composition additionally comprises soy sauce.

21. A composition for treating food according to claim 1, wherein the composition further comprises citric acid or a salt thereof.

22. A composition for treating food according to claim 21, wherein the salt of citric acid is potassium citrate.

23. A composition for treating food according to claims 1, wherein the colloidal silica is present in the composition in a concentration of between 30 parts per billion to 500 parts per million.

24. A method of modifying the properties of a food comprising the step of treating the food with an aqueous suspension of charged colloidal silica particles wherein the aqueous suspension is generated by slowly lowering the pH of an alkaline silica solution during circulation of the solution through a magnetic field to form charged colloidal silica particles in the solution of from about 10 to 100 Angstroms in size.

25. A method according to claim 24, wherein the alkaline silica solution is a solution of silica dioxide in sodium hydroxide.

26. A method according to claim 25, wherein the pH of the solution is lowered by titration with an acid.

27. A method according to claim 26, wherein the magnetic field is a quadrapolar magnetic field.

* * * * *